Aug. 2, 1938.   O. MAASS ET AL   2,125,639
APPARATUS FOR DETERMINING THE OPACITY OF PAPER AND OTHER MATERIALS
Filed Oct. 16, 1935

INVENTORS
OTTO MAASS
RONALD E. RICHARDSON
BY J. D. O'Connell
ATTORNEY

Patented Aug. 2, 1938

2,125,639

UNITED STATES PATENT OFFICE 2,125,639

APPARATUS FOR DETERMINING THE OPACITY OF PAPER AND OTHER MATERIALS

Otto Maass, Montreal, Quebec, and Ronald E. Richardson, Oshawa, Ontario, Canada, assignors to The Canadian Pulp and Paper Research Corporation, Montreal, Quebec, Canada Application October 16, 1935, Serial No. 45,294

4 Claims. (Cl. 88—14)

This invention relates to apparatus for determining the opacity of paper and other materials.

The object is to provide a generally improved apparatus of the type in which light sensitive cells are balanced against each other so that the current modifying effect obtained by interposing a sample of the paper or other material between one of the cells and a light source may be readily determined as an accurate measure of the opacity of the sample.

Proceeding now to a more detailed description reference will be had to the accompanying drawing in which—

Figure 2:
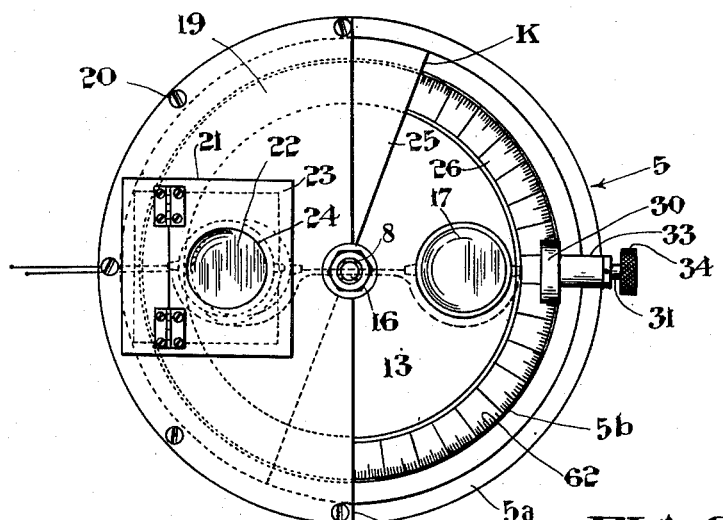
Figure 2 is a top plan view of the apparatus appearing in Figure 1.
Figure 1:
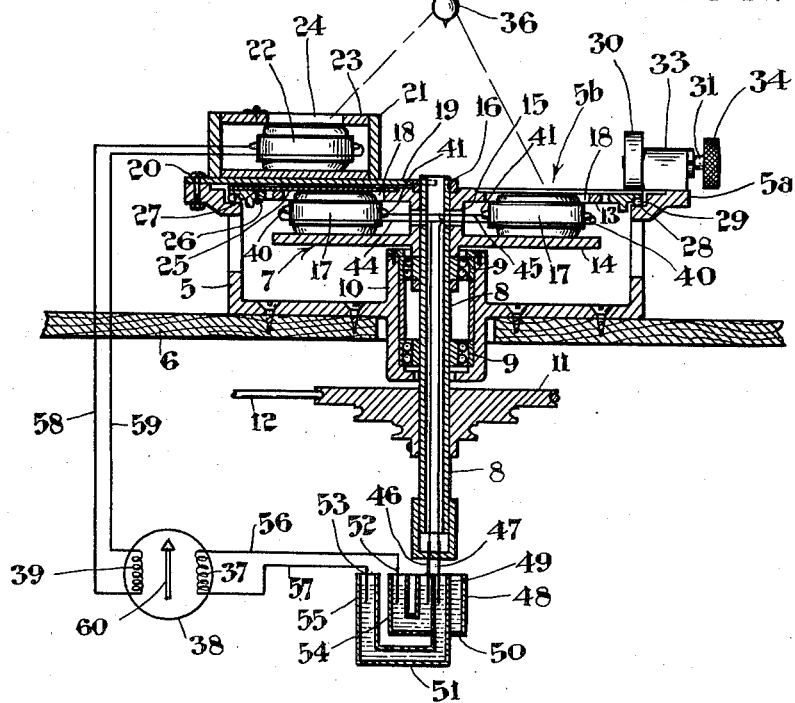
Figure 1 is a view, in vertical section, of one form of apparatus adapted to be used in accordance with this invention.

Referring more particularly to the drawing, 5 designates a casing mounted on a suitable supporting structure 6. This casing contains a rotary carrier 7 fixed to the upper end of a hollow shaft 8 which rotates in self-aligning ball bearings 9 fitted in a tubular portion 10 of said casing. A pulley 11 is fixed to shaft 8 below the casing 5 and is driven through belt 12 by means of an electric motor (not shown).

The carrier 7 comprises spaced upper and lower plates 13 and 14 joined together by a hub 15 which is fitted on the upper portion of shaft 8. The carrier is clamped in place between the upper shaft bearing 9 and a suitable clamping nut 16. A pair of photronic cells 17 are placed on the lower carrier plate 14 with their centres 180° apart, the upper portions of the cells being fitted in suitable openings 18 formed in the upper carrier plate 13.

One half of the top opening 5b of casing 5 is permanently closed off by a stationary, semi-circular, shutter plate 19 which is fastened to the casing rim 5a by bolts 20 or other suitable fastening means. A box 21, containing a photronic cell 22, is fastened to the upper surface of shutter plate 19. This box is provided with a hinged cover 23 having an opening 24 which, in the closed position of the cover, lies directly above the cell 22.

An adjustable, semi-circular, shutter plate 25 is arranged in the casing 5 between the stationary shutter plate 19 and the carrier 7. Plate 25 is fastened, by screws 26, to a carrier ring 27. This ring is rotatably supported on a ledge 28 of the casing by means of ball bearings 29 and is adapted to be rotated in a horizontal plane by a friction drive roller 30 fixed to the inner end of a shaft 31. This shaft is journalled in a suitable bearing 33 and carries a hand wheel 34 at its outer end. By turning the hand wheel 34 the movable shutter plate 25 may be adjusted to close off more or less of that portion of the top opening of casing 5 which is left uncovered by the stationary shutter plate 19. This adjustment of plate 25 is resorted to in order to vary the length of time that the cells 17 are exposed to the light source 36 during each revolution of the carrier 7.

The movable cells 17 are connected, in parallel with each other, to the operating coil 37 of a galvanometer 38, the remaining coil 39 of which is connected in series with the stationary cell 22. As here shown the terminals 40 and 41 of cells 17 are connected, by conductors 44 and 45, to terminals 46 and 47 carried at the lower end of shaft 8. These terminals 46 and 47 dip into the legs 48 and 49 of a pair of concentrically arranged mercury containers 50 and 51 and are thus connected to terminals 52 and 53 which are arranged to dip into the remaining legs 54 and 55 of said containers. Conductors 56 and 57 connect the terminals 52 and 53 to opposite ends of the galvanometer coil 37. The conductors connecting the cell 22 in series with the galvanometer coil 39 are shown at 58 and 59. With this method of connecting the cells the current generated in cells 17 is opposed to the current generated in cell 22 so that the position of the galvanometer pointer 60 is dependent upon the relative strengths of the opposed currents.

In the use of this apparatus the light passing through the cover opening 24 of box 21 generates a current in cell 22 which tends to deflect the galvanometer pointer 60 in one direction. At the same time the cells 17 are being successively exposed to light by rotation of the carrier 7 with the result that the currents generated in these cells tend to deflect the galvanometer pointer in the opposite direction. It will be assumed that the movable shutter 25 lies wholly beneath the stationary shutter 19 and that the light striking cells 17 is more intense than that striking the cell 22 or that cell 22 is weaker than either of cells 17. Under these circumstances the currents generated in cells 17 will be sufficiently stronger than that generated in cell 22 to produce a corresponding deflection of the galvanometer pointer in the last mentioned direction. If, now, the movable shutter plate 25 is rotated to partly close off that portion of casing opening 5b which is not covered by the shutter plate 19, then the time during which the rotating cells 17 are exposed to the light source 36 is decreased and produces a corresponding decrease in the strength of the current generated in said cells. From this it will be seen that, by appropriate adjustment of the shutter plate 25, the length of time during which the cells 17 are exposed to light may be regulated so that the currents generated in these cells will exactly balance that generated in cell 22, in which case the galvanometer shows no deflection. When this condition is achieved the area of the opening through which the cells 17 are exposed to light is proportional to the angle, assumed as X, between the points J and K of the fixed and adjustable shutter plates. The ring 27 is provided with a vernier scale 62 so that this angle may be readily determined for each position of the shutter 25.

When the shutter 25 has been adjusted so that the galvanometer pointer is at zero the apparatus is set for use in determining the opacity of paper or other materials. A sample to be tested is then placed in the box 21 between the cell 22 and the cover 23 so that it intercepts the light passing through the cover opening 24. The resulting decrease in the strength of the current generated in cell 22 causes a corresponding deflection of the galvanometer pointer 60. The shutter 25 is then adjusted until the galvanometer is again brought to zero deflection. After this adjustment of the shutter the vernier scale is again read to determine the angle between the points J and K. If this angle is assumed to be Y, then the ratio of the light received by the revolving cells 17, before and after introduction of the sample, is $\frac{X}{Y}$. Hence, the light intensities received by cells 17, before and after introduction of the sample, are also in the ratio of $\frac{X}{Y}$. The transmittance, i. e. the fraction of the incident light passing through the sample is thus $\frac{Y}{X}$.

The reading obtained in accordance with the invention may require a slight correction owing to the change in the angle of incident radiation on cell 22 caused by the interposition of the sample whose opacity is to be measured. Such correction may be made by simple methods known to the art, for example, by simple calibration with samples of known capacity.

Having thus described what we now consider to be a preferred embodiment of this invention it will be understood that various modifications may be resorted to within the scope of the appended claims. It is possible, for example, to use a modified form of the apparatus in which the stationary cell 22 is balanced against a single cell mounted on the rotatable carrier 7. In this case the movable cell would be stronger than the stationary cell to permit the opposed currents of the cells to be exactly balanced by appropriate adjustment of the movable shutter 25 or some equivalent means. It is also feasible to provide the carrier 7 with a greater number of parallel connected cells than that shown in the present drawing.

Having thus described our invention, what we claim is:—

1. Apparatus for determining the opacity of paper and the like, comprising a light source, a pair of photovoltaic cells positioned to receive light from said source, electrically operable indicating means, circuits connecting said indicating means and said cells in a manner to oppose the cell currents produced by the action of light from said source to register in said indicating means differences in the strengths of the opposed currents, a light intercepting member disposed between said light source and one of said cells and having an aperture therein, a rotary carrier behind said member, one of said cells being mounted eccentrically on said carrier behind said member, means for rotating said carrier to move the cell thereon periodically across the aperture at a predetermined speed, and a cover adjustable over said aperture to vary the effective area thereof.

2. Apparatus for determining the opacity of paper and the like, comprising a light source, a plurality of photovoltaic cells positioned to receive light from said source, one of said cells being fixed, electrically operable indicating means, a circuit connecting said fixed cell and the indicating means, a circuit connecting the other cells and the indicating means in opposition to said first circuit whereby said indicating means registers differences in the strengths of the currents produced in said fixed cell and in the other cells by action of light from said source, a stationary light intercepting member disposed between said light source and said other cells and having an aperture, a carrier mounted for rotation behind said member, said other cells being supported eccentrically on said carrier, means for rotating said carrier whereby the cells thereon are periodically successively moved across said aperture at a predetermined speed, and a cover adjustable over said aperture to vary the effective area thereof.

3. Apparatus for determining the opacity of paper and the like, comprising a light source, a plurality of photovoltaic cells positioned to receive light from said source, one of said cells being fixed, electrically operable indicating means, a circuit connecting the fixed cell and the indicating means, a circuit connecting the other cells and the indicating means in opposition to said first circuit whereby said indicating means registers differences in the strengths of the currents produced in said fixed cell and in the other cells by action of light from said source, a rotary carrier supporting eccentrically said other cells, means for rotating said carrier to cause travel of the cells thereon within the range of said light source, adjustable light intercepting means between said light source and the carrier cells, and means for adjusting said intercepting means to vary the extent of exposure of said carrier cells to the light from said source.

4. Apparatus as set forth in claim 3, in which the light intercepting means comprises a casing enclosing the rotary carrier and the cells thereon, a stationary plate covering a portion only of the top of the casing, and a cover adjustable relative to said plate over the remaining portion of the top of the casing.

OTTO MAASS.
RONALD E. RICHARDSON.